Sept. 7, 1948. W. McARTHUR 2,448,817
FASTENING DEVICE
Filed Nov. 11, 1944
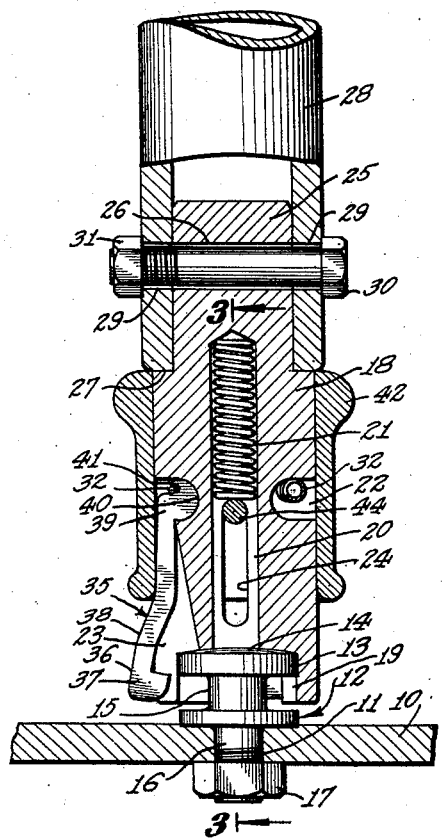
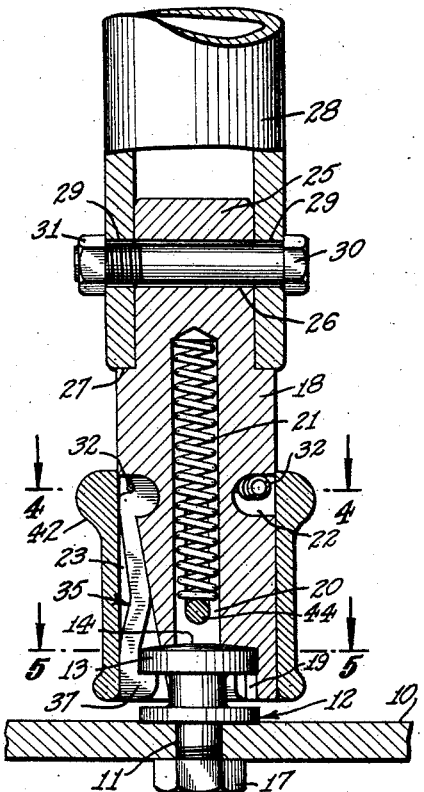
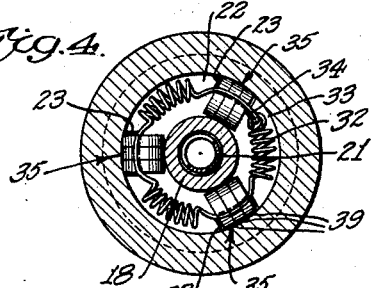
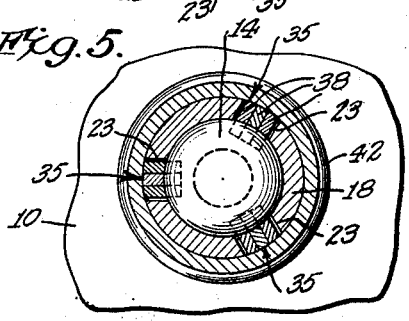
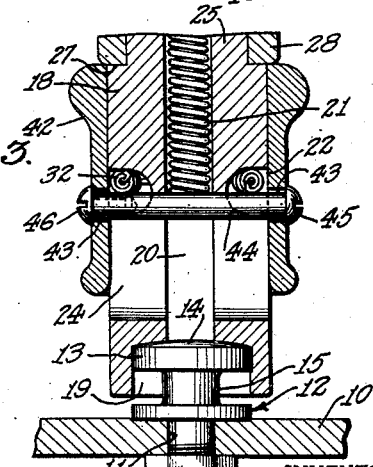
INVENTOR.
WARREN McARTHUR
BY
F. J. Pisarra
ATTORNEY Patented Sept. 7, 1948

2,448,817

UNITED STATES PATENT OFFICE 2,448,817

FASTENING DEVICE

Warren McArthur, Bantam, Conn., assignor, by mesne assignments, to Reconstruction Finance Corporation, New York, N. Y., a corporation of the United States Application November 11, 1944, Serial No. 562,987

8 Claims. (Cl. 287—20.5)

This invention relates to a fastening device for detachably connecting one article to another. Among other things, this invention is especially well-suited for removably securing a seat, table, rack or other item of equipment to the floor, side wall, or ceiling of an airplane, bus, railroad car, boat or other type of vehicle. The apparatus of this invention is, moreover, capable of being advantageously employed in various other locales where it is desirable to effect ready engagement and disengagement between structures without the use of tools.

An important object of this invention is to provide a fastening device for removably securing an article of furniture, such as a seat, to the floor or wall of an airplane or other vehicle in a manner that it may be readily locked in place and thereafter removed without the use of tools.

Another object of the invention is to provide a fastening device having locking elements so encased as to be protected against damage whether the device is in active use or is being moved from one place to another.

This invention has for another object the provision of a device of the character indicated so constructed and arranged that the same remains in locked position and does not become disengaged due to vibrations, impacts or the like.

A further object of the invention is to provide a fastening device that may be readily actuated by a simple manual operation.

A still further object of the invention resides in the provision of a relatively simple, lightweight, rugged fastening device that is adapted to perform its intended functions in an effective and trouble-free manner.

The instant invention contemplates a fastening device removably affixed to a seat leg or the like and adapted to be readily placed into and out of locking engagement with a suitable unit such as a stud head that is attached to any desired supporting structure, such as the floor of a vehicle. The fastening device includes a preferably cylindrical body having an annular groove and a plurality of spaced longitudinal grooves formed externally therein for the reception and guidance of a plurality of suitable hook means that are hingeably secured to the body and adapted to be swung toward and away from the axis of the body in response to predetermined movement of a sleeve slidable along the body in opposite directions. The body is provided with an end opening for the reception of a stud head which is engaged by the hook means when the latter are swung toward the axis of the body and disengaged by the hook means when the same are swung away from the axis of the body. The sliding sleeve is normally and resiliently urged in a direction for actuating the hook means into locking position. The relative position of the various parts is such that the hook members are protected against injury when the fastening device is operatively connected to the stud head, the same being true when the device is being moved from place to place.

The various objects, features and advantages of this invention will be readily understood by those skilled in the art by reference to the detailed description that follows taken with the accompanying drawings which respectively describe and illustrate a mechanism embodying a preferred form of the invention.

In the drawing:

Figure 1 is a view in elevation of the fastening device of this invention partly in central cross section and illustrating the parts in one relative position;

Figure 2 is a view similar to Figure 1 and illustrating the parts in another relative position;

Figure 3 is a cross section view taken along line 3—3 of Figure 1;

Figures 4 and 5 are sectional views taken along lines 4—4 and 5—5, respectively, of Figure 2.

Referring now to the drawing, wherein like reference numerals designate corresponding parts throughout the several views and more particularly to Figures 1 and 2, I have illustrated therein a plate 10 having a drill hole 11 and forming an integral part of a floor or the like (not shown). A connector unit generally denoted by numeral 12 includes a head 13 having an upper end bearing surface 14 and formed with an annular groove 15. Head 13 is carried at one end of a shank 16 that extends through drill hole 11 and is threaded along its opposite end to receive a retaining nut 17 whereby unit 12 is removably attached to plate 10.

Adapted to be placed into and out of locking engagement with head 13 of the connector unit 12, as illustrated in the drawing and as will be more fully explained hereinafter, is the fastening device of this invention which includes a body 18 that is preferably cylindrical and that is bored axially on several diameters to obtain an end compartment 19 for the reception of the upper portion of head 13 and a blind passage 20 for housing a compression spring 21. Body 18 is machined to also obtain an external annular groove or recess 22 and a plurality of spaced external grooves 23 formed longitudinally therein and connecting with annular recess 22 and end compartment 19. Body 18 is provided with a transverse elongated slot 24 that intersects passage 20.

Body 18 is also fabricated so as to obtain an end portion 25 of reduced cross-section area, having a diametric passage 26, and an annular shoulder 27. The lower end of a tubular seat leg or other article 28 is telescopically arranged with respect to portion 25 and bears against shoulder 27. Tubular leg 28 is provided with diametrically opposed openings 29 that align with passage 26 in portion 25, as illustrated, whereby the tubular leg is coupled to body 18 through the medium of a bolt 30 and a nut 31.

Disposed within annular recess 22 is a resilient ring that consists of a spring 32 having a loop 33 at one end that engages a hook 34 at its other end (Fig. 4). The spring is preferably of such size as to be placed in tension when its ends are united within annular recess 22.

The fastening device of this invention includes a plurality of unitary hook means generally indicated by numeral 35, each of which consists of a lower part 36 having a finger 37 extending laterally therefrom, a generally V-shaped central part 38 registering with a corresponding groove 23, and an upper part 39 having an arcuate portion 40, adapted to register with and ride in annular recess 22, and a notch 41 for engagement with spring 32 eccentrically of the center of curvature of arcuate portion 40. Annular recess 22, upper part 39 and spring 32 cooperate to form a hinge connection for each hook means 35; and, due to the force exerted by spring 32, the individual hook means are normally and yieldingly swung in a direction away from the axis of body 18 as shown in Figure 1. One or more hook means 35 is disposed in each groove 23. It has been ascertained that excellent results are obtained when three relatively thin hook means, as shown in Figure 4, are used in each slot 23.

A sleeve 42 embraces body 18 and is slidable therealong. Sleeve 42 is provided with a pair of diametrically opposed openings 43 (Fig. 3) and is coupled to body 18 through the medium of a pin 44 having a head 45 at one end and tapped at its other end for threaded attachment to a screw 46. It will be observed that pin 44 extends through transverse slot 24 whereby sliding movement of the sleeve with respect to body 18 is limited in either direction and further that compression spring 21 which bears against pin 44 normally urges sleeve 42 in a downward direction with respect to body 18.

With the fastening device assembled and attached to the lower end of tubular leg 28, sleeve 42 is moved upwardly against the action of compression spring 21, as allowed by slot 24 and pin 44, to the position shown in Figure 1. At such time each hook means 35 is swung about its hinge connection, due to the action of spring 32, in a direction away from the axis of body 18 and to the position shown in Figure 1. It will be observed that under these conditions finger 37 of each hook means 35 has been withdrawn from end compartment 19. The device is then placed above unit 12 and lowered so that head 13 is received in compartment 19. The various elements will at this time be in the relative position shown in Figure 1. Upon the release of sleeve 42, the same moves downwardly due to the action of compression spring 21, riding along the outer edge of each hook means 35 and swinging the latter about its hinge connection in a direction toward the axis of body 18 until the parts assume the position shown in Figure 2 with each finger 37 extending into the annular groove 15 of stud head 13, thereby effecting locking engagement between unit 12 and the fastening device. The fastening device may be readily disengaged from unit 12 by simply moving sleeve 42 upwardly against the action of spring 21 and permitting each hook means to be swung away from the axis of body 18 due to the action of spring 32.

Thus it will be seen that the construction herein shown and described is well adapted to accomplish the objects of the present invention. It will be understood, however, that the invention may be embodied otherwise than here shown, and that in the form illustrated certain obvious changes in construction may be made. Therefore, I do not wish to be limited precisely to the construction herein shown except as may be required by the appended claims considered with reference to the prior art.

I claim:

1. In a device of the class described, a body having an annular recess and a plurality of spaced grooves formed therein and intersecting said annular recess, a sleeve slidable along said body, a plurality of hook members, one part of each of said members being disposed in said annular recess and another part registering with a corresponding groove, and means engaging said one part of each member to form a hinge connection with said member and annular recess, said hook members and said means being so constructed and arranged that a portion of each member is swung about said hinge connection in a direction away from said body in response to predetermined movement of said sleeve along said body in one direction and in a direction toward said body in response to predetermined movement of said sleeve along said body in the opposite direction.

2. In a device of the class described, a body having a substantially coaxial annular recess and a plurality of spaced grooves formed longitudinally therein and intersecting said annular recess, a sleeve slidable along said body, a plurality of hook members, one part of each of said members being disposed in said annular recess and another part registering with a corresponding groove, and single resilient means engaging said one part of each member to form a hinge connection with said member and annular recess, said hook members and said means being so constructed and arranged that a portion of each member is swung about said hinge connection in a direction away from said body in response to predetermined movement of said sleeve along said body in one direction and in a direction toward said body in response to predetermined movement of said sleeve along said body in the opposite direction.

3. In a device of the class described, a body having a substantially coaxial external annular recess and a plurality of spaced external grooves formed longitudinally therein and intersecting said annular recess, a sleeve slidable along said body, a plurality of hook members, one part of each of said members being disposed in said annular recess and another part registering with a corresponding groove, and means in said annular recess engaging one part of each member to form a hinge connection with said member and annular recess, said hook members and said means being so constructed and arranged that a portion of each member is swung about said hinge connection in a direction away from said body in response to predetermined movement of said sleeve along said body in one direction, and in a direction toward said body in response to predetermined movement of said sleeve along said body in the opposite direction, and means for normally and yieldingly moving said sleeve along said body in said opposite direction.

4. In a device of the class described, a body having a substantially coaxial external annular recess and a plurality of spaced external grooves formed longitudinally therein and intersecting said annular recess, a sleeve slidable along said body, a plurality of hook members, one part of each of said members being disposed in said annular recess and another part registering with a corresponding groove, single resilient means in said annular recess engaging said one part of each member to form a hinge connection with said member and annular recess, said hook members and said means being so constructed and arranged that a portion of each member is swung about said hinge connection in a direction away from said body in response to predetermined movement of said sleeve along said body in one direction, and in a direction toward said body in response to predetermined movement of said sleeve along said body in the opposite direction, means for normally and yieldingly moving said sleeve along said body in said opposite direction, and means for limiting movement of said sleeve along said body in either direction.

5. In a device of the class described, a body having a substantially coaxial external annular recess, a plurality of spaced external grooves formed longitudinally therein and intersecting said annular recess, and a transverse slot, a sleeve slidable along said body, a plurality of hook members, one part of each of said members being disposed in said annular recess and another part registering with a corresponding groove, means in said annular recess engaging said one part of each member, to form a hinge connection with said member and annular recess, said hook members and said means being so constructed and arranged that a portion of each member is swung in a direction away from said body in response to predetermined movement of said sleeve along said body in one direction, and in a direction toward said body in response to predetermined movement of said sleeve along said body in the opposite direction, and means carried by said sleeve and extending into said slot for limiting movement of said sleeve along said body in either direction.

6. In a device of the class described, a body having a substantially coaxial external annular recess, a plurality of spaced external grooves formed longitudinally therein and intersecting said annular recess, a substantially axial passage, and a transverse slot intersecting said passage, a sleeve slidable along said body, a plurality of hook members, one part of each of said members being disposed in said annular recess and another part registering with a corresponding groove, means in said annular recess engaging said one part of each member, to form a hinge connection with said member and annular recess, said hook members and said means being so constructed and arranged that a portion of each member is swung about said hinge connection in a direction away from said body in response to predetermined movement of said sleeve along said body in one direction, and in a direction toward said body in response to predetermined movement of said sleeve along said body in the opposite direction, means carried by said sleeve and extending into said slot for limiting movement of said sleeve along said body in either direction, and means in said passage for cooperating with the last mentioned means to normally and yieldingly urge said sleeve in said opposite direction.

7. In a device of the class described, a body having a substantially coaxial external annular recess, a plurality of spaced external grooves formed longitudinally therein and intersecting said annular recess, a substantially axial passage, and a transverse slot intersecting said passage, a sleeve slidable along said body, a plurality of hook members, one part of each of said members being disposed in said annular recess and another part registering with a corresponding groove, single resilient means in said annular recess engaging said one part of each member, to form a hinge connection with said member and annular recess, said hook members and said means being so constructed and arranged that a portion of each member is swung about said hinge connection in a direction away from said body in response to predetermined movement of said sleeve along said body in one direction, and in a direction toward said body in response to predetermined movement of said sleeve along said body in the opposite direction, means carried by said sleeve and extending into said slot for limiting movement of said sleeve along said body in either direction, and means in said passage for cooperating with the last mentioned means to normally and yieldingly urge said sleeve in said opposite direction.

8. In a device of the class described, a body having at least one recess and a plurality of spaced grooves intersecting said recess formed therein, a member carried by said body and movable therealong, a plurality of hook elements, at least one part of each hook element being disposed in said recess and another part registering with a corresponding groove, resilient means engaging a part of each element in the region of said recess to form a hinge connection with said hook element and said recess, said hook elements and said means being so constructed and arranged that a portion of each hook element is swung about said hinge connection in a direction away from the body in response to predetermined movement of the member along said body in one direction, and in a direction toward the body upon predetermined movement of the member along said body in the opposite direction.

WARREN McARTHUR.

REFERENCES CITED

The following references are of record in the file of this patent:

UNITED STATES PATENTS

| Number | Name | Date |
| --- | --- | --- |
| 54,990 | Wimmer | May 22, 1866 |
| 423,386 | Miller | Mar. 11, 1890 |
| 2,153,679 | Rich | Apr. 11, 1939 |
| 2,259,137 | Iftiger, Sr. | Oct. 14, 1941 |

FOREIGN PATENTS

| Number | Country | Date |
| --- | --- | --- |
| 537,236 | France | May 18, 1922 |
| 10,788 | Great Britain | 1912 |
| 450,062 | Great Britain | July 9, 1936 |

Certificate of Correction

Patent No. 2,448,817.  September 7, 1948.

WARREN McARTHUR

It is hereby certified that error appears in the printed specification of the above numbered patent requiring correction as follows:

Column 5, line 46, claim 5, after the word "swung" insert *about said hinge connection*;

and that the said Letters Patent should be read with this correction therein that the same may conform to the record of the case in the Patent Office.

Signed and sealed this 25th day of January, A. D. 1949.

[SEAL]

THOMAS F. MURPHY,
*Assistant Commissioner of Patents.*